…

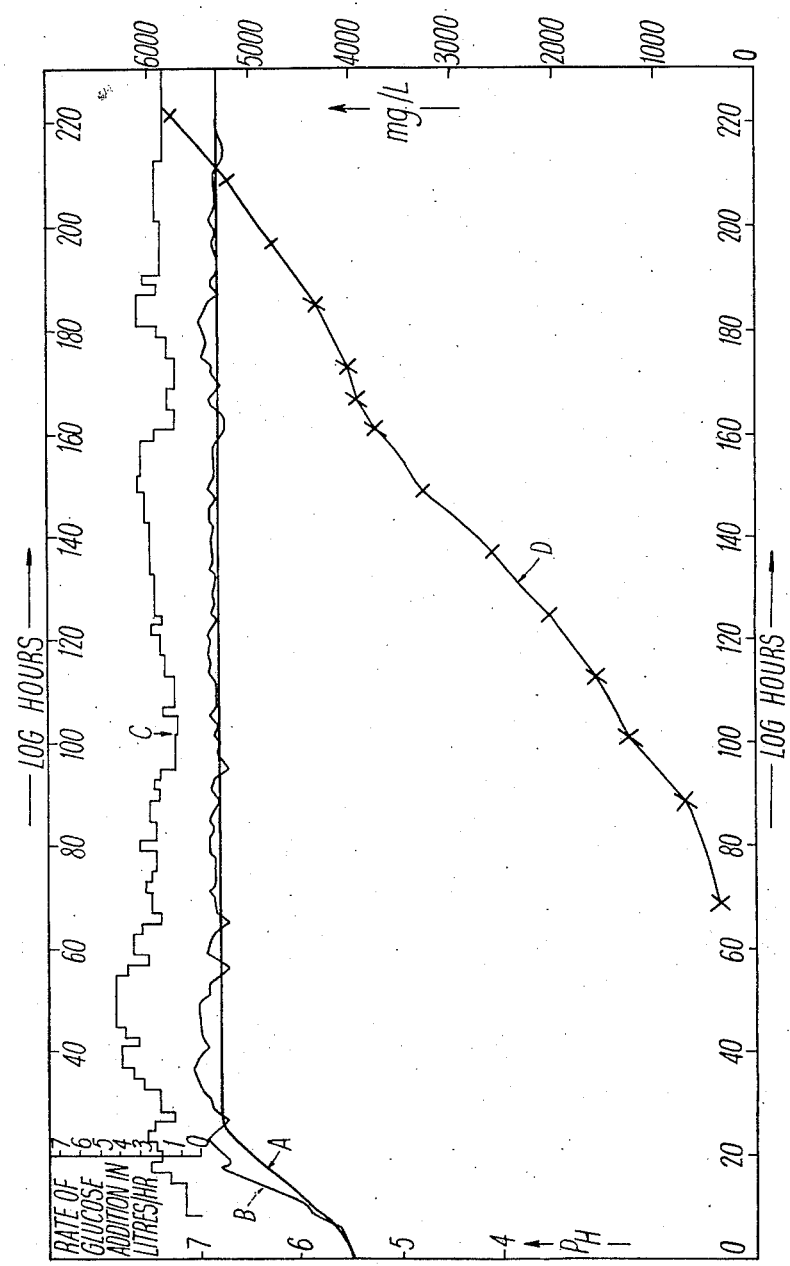

United States Patent Office 3,038,839
Patented June 12, 1962

3,038,839
PROCESS FOR THE PRODUCTION OF GRISEOFULVIN
Donald John Darlington Hockenhull, Ulverston, England, assignor to Glaxo Laboratories Limited, Middlesex, England, a British company
Filed Feb. 24, 1960, Ser. No. 10,586
Claims priority, application Great Britain Mar. 2, 1959
9 Claims. (Cl. 195—80)

This invention is concerned with improvements in or relating to the production of the antibiotic griseofulvin.

Griseofulvin, which is an important antifungal antibiotic, is produced by the culture of various species of the genus Penicillium and in British Patent No. 784,618 are described methods of conducting such cultures under submerged aerobic conditions more suited to commercial production than the previously described surface culture technique. As stated in the said specification, various factors are important in the submerged culture of griseofulvin-producing organisms if reasonable yields are to be obtained, the chief of which is the level of nitrogen in the culture medium; it is also stated that the level of carbohydrate is important and that this should be somewhat higher than might be expected.

We have now found that it is possible to achieve improved yields in the submerged aerobic culture of griseofulvin-producing organisms by control of the pH of the culture at is proceeds. Thus, in experiments we have carried out, we have found that as the culture proceeds the pH of the medium changes, the actual pH from time to time being dependent upon a number of factors including the nature of the medium, rate of aeration and the type and size of the culture vessel used. We have found, however, that the pH of the fermentation is particularly sensitive to the carbonhydrate concentration present at a given instant and, thus, for example, the addition of carbohydrate at any given instant is quickly followed by a drop in the pH of the medium. This observation has enabled us to control the pH of a griseofulvin-producing fermentation by the simple expedient of making additions of carbohydrate from time to time to induce a fall in the pH as required, such added carbohydrate serving also as a source of carbon and energy for the mould. Further investigations have shown that for given conditions of culture there is what may be described as an "ideal" curve which the pH of the medium should follow if plotted against time, which ideal curve results in considerably increased titres as compared with a culture carried out under ordinary—uncontrolled pH—conditions.

It will, of course, be appreciated that the expression an "ideal" pH curve designates the curve which is deduced experimentally and which the pH should follow for optimum results for given conditions and that, in practice, it is difficult if not impossible to conduct a fermentation exactly according to this curve; however, if a culture is conducted so that the curve followed by the pH is closer in shape to the ideal pH curve than a culture carried out without any pH control, improved titres in general result. We thus use the expression "controlled pH curve" herein to designate a pH curve which is closer in shape to the ideal pH curve than the pH curve of a fermentation without any pH control.

According to the invention, therefore, we provide a process for the production of griseofulvin by the submerged aerobic culture of a griseofulvin-producing organism in a nutrient medium therefor which comprises repeatedly adding to the culture a nutrient carbohydrate serving to supply the carbon and energy requirement of the organism, such additions of carbohydrate being in such quantities and at such time that the pH of the medium follows a controlled pH curve as herein defined.

Preferably, the pH of the fermentation is maintained between 6.6 and 7.6 during the bulk of the fermentation period and desirably between 6.8 and 7.2. It is generally desirable that the pH curve should conform approximately to a straight line for a substantial part of the fermentation and after the initial stages of the fermentation in general after about 20 hours. The fermentation is preferably initiated with the medium at a pH somewhat below the desired controlled pH and using a medium low in or even devoid of carbohydrate. The pH then rapidly rises as the culture proceeds and shortly before it reaches the desired controlled pH an amount of nutrient carbohydrate is added, the effect of which is to slow down or stop the rise in pH, or, if necessary, cause a reduction therein if a tendency to overshoot the desired level is observed. In general we prefer to conduct the fermentation such that the desired controlled pH level is reached fairly rapidly and desirably within 24 hours.

As the carbohydrate is consumed by the mould, the pH will start to rise whereupon an addition of a further quantity of carbohydrate is made. The exact times at which the carbohydrate is added and the quantities to be added can only be judged by considering the behaviour of the pH in the light of experience. One must thus add so much carbohydrate when the pH tends to move away from the ideal curve that such tendency will stop, any actual displacement being negatived. Too great an addition will, however, cause the pH to fall below the ideal curve. This process is then repeated as necessary according to the behaviour of the pH. In general, however, fairly frequent additions of carbohydrate are necessary, the amount of each addition varying. The ideal pH curve as stated above itself must be determined for a given set of conditions by conducting a number of trial fermentations sufficient to enable the position and shape of the ideal curve to be estimated.

It is possible to add the carbohydrate at a continuous preselected rate, but this however requires that its rate of addition be exactly that required to maintain the pH at the chosen value. In practice this is often difficult to arrange, with the result that the addition of separate quantities of carbohydrate from time to time, the amount of which is chosen to correct the pH as necessary, represents the preferred method of operation.

We will now discuss in greater detail the various factors involved in the process according to the invention.

For the purpose of the present invention, many griseofulvin-producing species of the genus Penicillium may be used including in particular the following:

Penicillium patulum C.M.I. 28,808 Bainier Coll-Thom (4640–454). NCTC (1722), 1932—NRRL 994, ATCC 9260.
Penicillium urticae Bain (Rg 8g).
(P. griseofulvum) C. B. S. Baarn.
Penicillium nigricans (Bain) (Zaleski). C. B. S. Baarn.
Penicillium janczewskii Zal. C.M.I. 29,100. (Soil, Lakenheath Warren, Suffolk, 1947, J. H. Warcup B25).
Penicillium albidum Sopp. C.M.I. 40,219.
Penicillium raciborskii Zal. C.M.I. 40,568.
Penicillium melinii Thom. C.M.I. 40,216.

We, however, have found that best results are obtained with *Penicillium patulum* Bainier Thom (C.M.I. 39,809; NRRL 989 as *P. urticae* Bain (A)—G. Smith, 1949). It will be appreciated by those skilled in the art that the productivity of any given species may frequently be improved by mutation and the present invention includes within its scope the use of mutated strains. Methods of mutating griseofulvin-producing organisms for the production of strains having increased productivity are for example described in British Patent No. 788,118.

The organism is preferably introduced into the production medium as a vegetative inoculum, some 10% of inoculum being preferably used. The vegetative inoculum itself may for example be developed from spores by way of a vegetative seed stage, for example as described in British Patent No. 784,618. If desired, however, the production medium itself may be directly inoculated with spores of the organism.

The medium employed will essentially comprise a source of nitrogen and growth promoting substances which may be synthetic in type, i.e. composed of nutrient simple amino acids and/or simple nitrogen compounds; preferably, however, the source of nitrogen is of the complex organic type such as corn steep liquor, various nitrogenous milk products, such as whey powder, butter milk, etc., cotton seed meal, oatmeal, distillers solubles or soya bean meal. Of these, corn steep liquor is preferred. The amount of assimilable nitrogen supplied to the medium preferably corresponds to from 0.04% to 0.3% N, conveniently from 0.075 to 0.25% N.

The medium will further comprise nutrient salts including phosphate, conveniently as potassium dihydrogen phosphate, advantageously at a level of from 0.4–0.8%. A source of chloride ions is also desirably present, for example sodium chloride or potassium chloride preferably maintained at a level of at least 0.1% but preferably less than 0.3%. The inclusion of chalk or limestone in the medium e.g. at a level of from 0.4–0.8% is found beneficial, serving inter alia to buffer the medium.

The medium is preferably formulated poor in or entirely free from carbohydrate (other than any naturally present in the nitrogen source) before the commencement of the fermentation in order to achieve a rapid rise in pH to the desired controlled pH value. Where some carbohydrate is included this may be any carbohydrate assimilable by the organism, e.g. starch, lactose, glucose, etc.

The carbohydrate added from time to time during the fermentation for the purpose of controlling the pH as herein defined may again be any carbohydrate assimilable by the mould but it is an advantage of the present process that the cheaper carbohydrates, such as glucose, starch, dextrins, starch hydrolysates, sucrose, xylose mixtures and cane molasses are more efficiently used than when these materials are used in a conventional fermentation, i.e. included in the medium in toto from the commencement of fermentation. Thus, in a conventional fermentation it is found that best results are obtained by the use of lactose as carbohydrate whereas, in the present process, results achieved using, for example, glucose are found to be as good as if not superior to those obtained with lactose. Preferably, the carbohydrate additions are made in the form of aqueous solutions of the carbohydrate, which solutions may also contain other nutrients which it may be desired to add as the fermentation proceeds, such as inorganic salts, antifoam agents, etc.

The rate of stirring and the rate of aeration of the medium are best determined by experiments and are to some extent inter-dependent. They are further affected by the shape of the fermenter vessel used as well as the nature of the components of the medium. It should, however, be noted that in general the higher the air dispersion the higher is the pH of the medium.

We have, for example, found that with a fermentation volume of 400 imperial gallons and a rate of stirring of 160–165 r.p.m., suitable aeration is provided by the passage of 80 cubic feet of air through the medium per minute. Generally, it is desirable to initiate the fermentation at low rates of aeration which are gradually increased as the culture proceeds.

Antifoam agents, e.g. of the white mineral oil type, may be added as necessary to control undue foaming in the medium.

The griseofulvin can be recovered from the fermentation medium in any convenient way, for example as described in British Patent No. 784,618.

We will now describe by way of illustration only an example of the present process with reference to the accompanying drawing, in which are represented graphically the pH of the medium as against time as compared with the "ideal" pH curve determined for the conditions used, the amount and frequency of carbohydrate addition and the rate of accretion of titre. In this example, 400 imperial gallons of the following medium were used:

| CSL solids to give— | Percent |
|---|---|
| Nitrogen | 0.175 |
| Limestone | 0.4 |
| Potassium dihydrogen phosphate | 0.4 |
| Potassium chloride | 0.15 |
| Proprietary antifoam agent | 0.055 |

The pH of this medium was 5.50. The medium was sterilised for 15 minutes at 121° C. The medium was inoculated with a 10% vegetative inoculum.

Air flow was maintained at 25 cf./m. for the first 5 log hours, 50 cf./m. from 5–10 log hours and thereafter at 80 cf./m.

Referring to the drawing, curve A represents the "ideal" pH curve which was deduced from a large number of trial fermentations as representing those conditions of pH giving optimal results under the fermentation conditions stated above and in the particular fermenter vessel used. Curve B represents the actual pH as measured on the medium with a pH meter. Curve C indicates the rate of glucose addition in litres per hour whilst curve D represents the titre in mg./l.

As will be seen, the fermentation was commenced with no carbohydrate present. At the 9th hour semi-continuous addition of glucose (consisting of 50% w./v. aqueous solution of hydrolysed starch) was commenced at the rate of 0.75 litre per hour. The additions were made as separate shots of 100–300 ml. every 2, 4 or 8 minutes. As can be seen the pH continued to rise rapidly and as the substantially straight portion of the ideal pH curve was reached (pH 6.8) the rate of glucose addition was increased to 5.0 litres per hour. After the 20th hour the actual pH curve settled down to an average of pH 6.8 and a comparison of curves B and C as the fermentation proceeds shows how any tendency of the pH to rise is checked by an increase in the rate of glucose addition. Any undue drop in pH is checked by slowing down the rate of glucose addition. In this particular experiment, it will be noted that the actual pH curve reached the desired substantially constant value of 6.8 rather earlier than was believed desirable from the ideal pH curve, namely after some 19 hours. As can be seen from the drawing, in this example the titre reached a figure of 5,800 mg./l. after some 220 log hours.

Using the same conditions as to medium and fermenter vessel, further fermentations were carried out, the results of which are shown in the following table. The substantially straight part of the pH curve was maintained at varying positions as stated and the results compared with a conventional fermentation in which lactose was used as the nutrient carbohydrate, added entirely at the commencement of fermentation. The results were as follows:

| Experiment No. | Titre mg./l. griseofulvin | | | |
|---|---|---|---|---|
| | 1 | 2 | 3 | Conventional lactose fermentation |
| pH control | 6.8 | 7.0 | 7.2 | |
| Age hours: | | | | |
| 101 | 1,260 | 1,070 | 1,070 | 680 |
| 125 | 2,020 | 1,910 | 1,670 | 1,160 |
| 149 | 3,270 | 3,040 | 2,480 | 1,920 |
| 173 | 4,000 | 3,590 | 3,350 | 2,520 |
| 197 | 4,740 | 4,300 | 3,870 | 3,840 |
| 221 | 5,760 | 5,410 | 4,480 | 4,160 |
| 245 | 6,300 | 6,070 | 5,150 | 4,520 |
| 260 | | | | 5,080 |
| 269 | 6,400 | 6,640 | 6,200 | |
| 284 | 6,800 | | 5,500 | |
| 293 | | | | |
| 317 | | 7,620 | | |
| 341 | | 8,040 | | |
| 357 | | 8,400 | | |

In experiment No. 3 the rate of aeration (after 10 hours) was only 40 cf./m. as against 80 cf./m. in the remaining experiments. In experiment No. 3 the pH control line was dropped to 6.8 at 240 log hours, the rate of aeration then being raised to 80 cf./m.

I claim:

1. A process for the production of griseofulvin by the submerged aerobic culture of a griseofulvin-producing organism which comprises initiating the culture at a pH less than 6.6 in a medium poor in nutrient carbohydrate, allowing the culture to proceed until the pH reaches about 6.6 and thereafter repeatedly adding nutrient carbohydrate in such quantities and at such times that the pH remain between 6.6 and 7.6.

2. A process as claimed in claim 1 in which the pH is maintained between 6.8 and 7.2 for the bulk of the fermentation.

3. A process as claimed in claim 1 in which the pH is maintained substantially constant for a substantial part of the fermentation.

4. A process as claimed in claim 1 in which the nutrient carbohydrate employed is selected from the group consisting of glucose, lactose, starch, dextrin, starch hydrolysate, sucrose, xylose and cane molasses.

5. A process as claimed in claim 1 in which the organism employed is *Penicillium patulum* C.M.I. 39,809.

6. A process as claimed in claim 1 in which the nutrient medium contains as a source of nitrogen, at least one member selected from the group consisting of corn steep liquor, a nitrogenous milk product, cotton seed meal, oatmeal, distillers solubles and soya bean meal.

7. A process as claimed in claim 6 in which the nutrient medium includes a phosphate.

8. A process as claimed in claim 7 in which the nutrient medium includes a source of chloride ions.

9. A process as claimed in claim 8 in which the nutrient medium includes a member selected from the group consisting of chalk and limestone.

References Cited in the file of this patent
UNITED STATES PATENTS

| 2,674,561 | Moyer | Apr. 6, 1954 |
| 2,830,934 | Freaney | Apr. 15, 1958 |
| 2,906,673 | Borrow et al. | Sept. 29, 1959 |